(12) United States Patent
Furui (10) Patent No.: US 8,337,023 B2
(45) Date of Patent: Dec. 25, 2012

(54) PROJECTOR AND TRAPEZOIDAL DISTORTION CORRECTING METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 12/794,885

(22) Filed: Jun. 7, 2010

(65) Prior Publication Data

US 2010/0315601 A1  Dec. 16, 2010

(30) Foreign Application Priority Data

Jun. 11, 2009  (JP) ................................. 2009-140119

(51) Int. Cl.
*G03B 21/14* (2006.01)
*H04N 3/22* (2006.01)
(52) U.S. Cl. ............... 353/70; 353/31; 353/69; 348/806
(58) Field of Classification Search ................ 353/31, 353/69, 70; 348/806
See application file for complete search history.

(56) References Cited

U.S. PATENT DOCUMENTS

| 7,125,122 B2 * | 10/2006 | Li et al. ............................ 353/31 |
| 7,347,564 B2 | 3/2008 | Matsumoto et al. |
| 7,452,084 B2 | 11/2008 | Mochizuki |
| 2002/0122161 A1 * | 9/2002 | Nishida et al. .................. 353/70 |
| 2005/0270496 A1 * | 12/2005 | Mochizuki ....................... 353/70 |
| 2006/0170877 A1 * | 8/2006 | Kamiya et al. .................. 353/69 |
| 2008/0239246 A1 * | 10/2008 | Yamamoto ....................... 353/69 |
| 2010/0128231 A1 * | 5/2010 | Furui .............................. 353/70 |

FOREIGN PATENT DOCUMENTS

| JP | 2005-229293 A | 8/2005 |
| JP | 2005-347790 A | 12/2005 |
| JP | 2006-060447 A | 3/2006 |
| JP | 2008-211353 A | 9/2008 |
| JP | 2008-211355 A | 9/2008 |

* cited by examiner

*Primary Examiner* — Georgia Y Epps
*Assistant Examiner* — Magda Cruz
(74) *Attorney, Agent, or Firm* — AdvantEdge Law Group, LLC (57) ABSTRACT

A projector includes: capturing section that images an object on which an image is projected to produce a captured image; a projection distance information generating section that generates projection distance information representing a projection distance, which is the distance to the object on which an image is projected; a judging section that judges based on the projection distance information whether the projection distance exceeds a reference value; and a correcting section that performs trapezoidal distortion correction based on boundary lines of the object on which an image is projected contained in the captured image when the projection distance exceeds the reference value, whereas performing trapezoidal distortion correction based on at least coordinate information representing three-dimensional coordinates of the object on which an image is projected when the projection distance does not exceed the reference value.

8 Claims, 9 Drawing Sheets

PROJECTOR AND TRAPEZOIDAL DISTORTION CORRECTING METHOD

BACKGROUND

1. Technical Field

The present invention relates to a projector, an information storing medium, and a trapezoidal distortion correcting method.

2. Related Art

As a trapezoidal distortion correcting method employed in a projector (trapezoidal distortion correction is also called, for example, trapezoidal correction and keystone correction), for example, JP-A-2005-229293 proposes a correcting method in which a plurality of phase difference sensors is used to measure the distances to a plurality of measurement points on an object on which an image is projected, and JP-A-2005-347790 proposes a correcting method in which an image sensor is used to capture an image and acquires information on the peripheral boundary lines of an object on which an image is projected.

In the distance measuring method, however, since the measurement precision decreases when the distance to the object on which an image is projected increases, the projector cannot correct a trapezoidal distortion accurately. On the other hand, in the method carried out by acquiring information on the peripheral boundary lines or the shape of the object on which an image is projected, the projector cannot correct a trapezoidal distortion accurately because part of the captured image includes no boundary line when the distance to the object on which an image is projected decreases.

SUMMARY

An advantage of some aspects of the invention is to provide a projector, an information storing medium, and a trapezoidal distortion correcting method that allow a trapezoidal distortion to be corrected accurately irrespective of the projection distance.

A projector according to an aspect of the invention includes an capturing section that captures an object on which an image is projected to produce a captured image, a projection distance information generating section that generates projection distance information representing a projection distance, which is the distance to the object on which an image is projected, a judging section that judges based on the projection distance information whether the projection distance exceeds a reference value, and a correcting section that performs trapezoidal distortion correction based on boundary lines of the object on which an image is projected contained in the captured image when the projection distance exceeds the reference value, whereas performing trapezoidal distortion correction based on at least coordinate information representing three-dimensional coordinates of the object on which an image is projected when the projection distance does not exceed the reference value.

A trapezoidal distortion correcting method according to yet another aspect of the invention is used in a projector, and the method includes the steps of capturing an object on which an image is projected by using a capturing device to produce a captured image, generating projection distance information representing a projection distance, which is the distance to the object on which an image is projected, judging based on the projection distance information whether the projection distance exceeds a reference value, and performing trapezoidal distortion correction based on boundary lines of the object on which an image is projected contained in the captured image when the projection distance exceeds the reference value, whereas performing trapezoidal distortion correction based on at least coordinate information representing three-dimensional coordinates of the object on which an image is projected when the projection distance does not exceed the reference value.

According to the aspects of the invention, the trapezoidal distortion correction can be performed by using the projection distance-based method, whereby the trapezoidal distortion correction can be performed accurately irrespective of the projection distance.

The projection distance information generating section may generate the projection distance information based on the captured image.

In the thus configured projector, the projection distance information can be generated and the trapezoidal distortion correction can be performed by using only the captured image without measuring the projection distance with a distance sensor, prompting a user to select or input a value representing the projection distance, or any other operation.

The correcting section may include a boundary line information generating section that generates based on the captured image boundary line information on the coordinates of the boundary lines of the object on which an image is projected contained in the captured image, and a first distortion correction information generating section that generates based on the boundary line information first distortion correction information for performing the trapezoidal distortion correction.

In the thus configured projector, the trapezoidal distortion correction can be performed in accordance with the shape or any other suitable parameter of the object on which an image is projected.

The correcting section may include a coordinate information generating section that generates based on the captured image coordinate information representing the three-dimensional coordinates of a plurality of points on the object on which an image is projected, a projection angle information generating section that generates projection angle information representing the projection angle based on the coordinate information, and a second distortion correction information generating section that generates based on the projection angle information second distortion correction information for performing the trapezoidal distortion correction.

In the thus configured projector, the trapezoidal distortion correction can be performed in accordance with the projection angle.

The second distortion correction information generating section may generate the second distortion correction information based on the projection angle information and the boundary line information.

In the thus configured projector, the trapezoidal distortion correction can be performed in accordance with the shape or any other suitable parameter of the object on which an image is projected and the projection angle.

The correcting section may include a trapezoidal distortion correcting section that performs trapezoidal distortion correction based on the first distortion correction information when the projection distance exceeds the reference value, whereas performing trapezoidal distortion correction based on the second distortion correction information when the projection distance does not exceed the reference value.

In the thus configured projector, the trapezoidal distortion correction can be performed by selecting distortion correction information in accordance with the projection distance.

The projection distance information generating section may generate the projection distance information based on the coordinate information.

In the thus configured projector, the projection distance information can be generated in accordance with the three-dimensional coordinates of the plurality of points on the object on which an image is projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments in which the invention is applied to a projector will be described below with reference to the drawings. It is noted that the embodiments described below do not limit in any sense the contents of the invention set forth in the claims. It is further noted that all the configurations shown in the following embodiments are not necessarily essential for solutions in the invention set forth in the claims.

First Embodiment

A projector according to the present embodiment has a function of generating two pieces of distortion correction information by using two types of method, selecting one of the two pieces of distortion correction information in accordance with the projection distance, and using the selected distortion correction information to correct a trapezoidal distortion. A description will be made of function blocks of a projector having the function described above.

Figure 1:
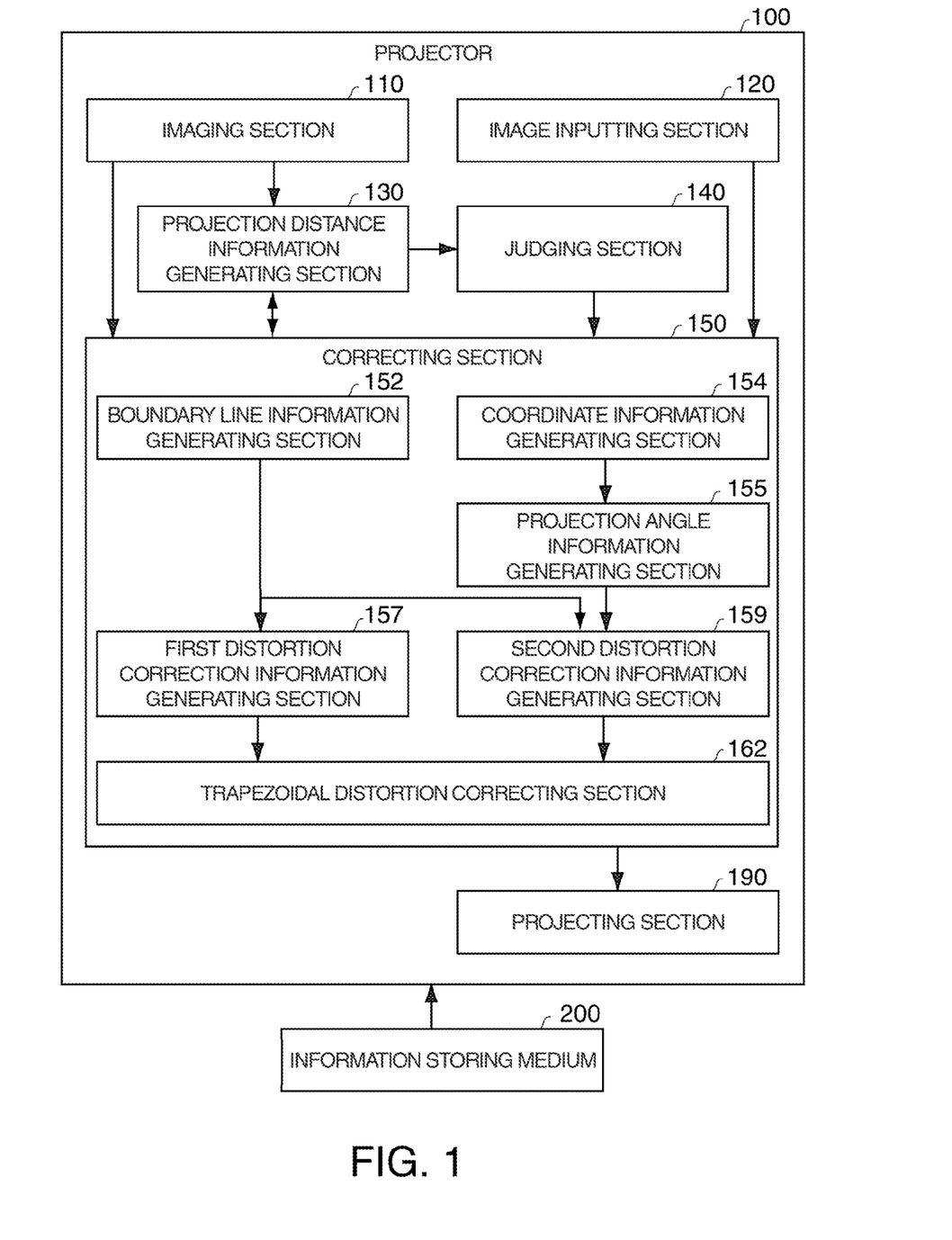
FIG. 1 is a functional block diagram of a projector in a first embodiment.

FIG. 1 is a functional block diagram of a projector 100 in the first embodiment. The projector 100 includes an capturing section 110 that captures an image for measurement or other purposes to produce a captured image, an image inputting section 120 to which image information (RGB signals, for example) is inputted from a PC (Personal Computer) or any other apparatus, a projection distance information generating section 130 that generates projection distance information representing the projection distance, a judging section 140 that judges, for example, whether the projection distance exceeds a reference value, a correcting section 150 that performs trapezoidal distortion correction and other operations, and a projecting section 190 that projects an image.

The correcting section 150 includes a boundary line information generating section 152 that generates boundary line information representing the position of an outer frame of a screen and other parameters thereof, a coordinate information generating section 154 that generates coordinate information representing three-dimensional coordinates of a predetermined point on the screen, a projection angle information generating section 155 that generates projection angle information representing a projection angle, a first distortion correction information generating section 157 that generates first distortion correction information, a second distortion correction information generating section 159 that generates second distortion correction information, and a trapezoidal distortion correcting section 162 that performs trapezoidal distortion correction.

The projector 100 may use the following hardware to achieve the functions described above: For example, the projector 100 may use a CCD camera or any other suitable device as the capturing section 110, an image signal input port, a converter, and other components as the image inputting section 120, a CPU and other components as the projection distance information generating section 130 and the judging section 140, a CPU, an image processing circuit, and other components as the correcting section 150, and a lamp, a liquid crystal panel, a liquid crystal drive circuit, a projection lens, and other components as the projecting section 190.

A computer accommodated in the projector 100 may read a program stored in an information storing medium 200 and function as the projection distance information generating section 130 and other sections. Examples of the information storing medium 200 may include a CD-ROM, a DVD-ROM, a ROM, a RAM, and an HDD.

Figure 2:
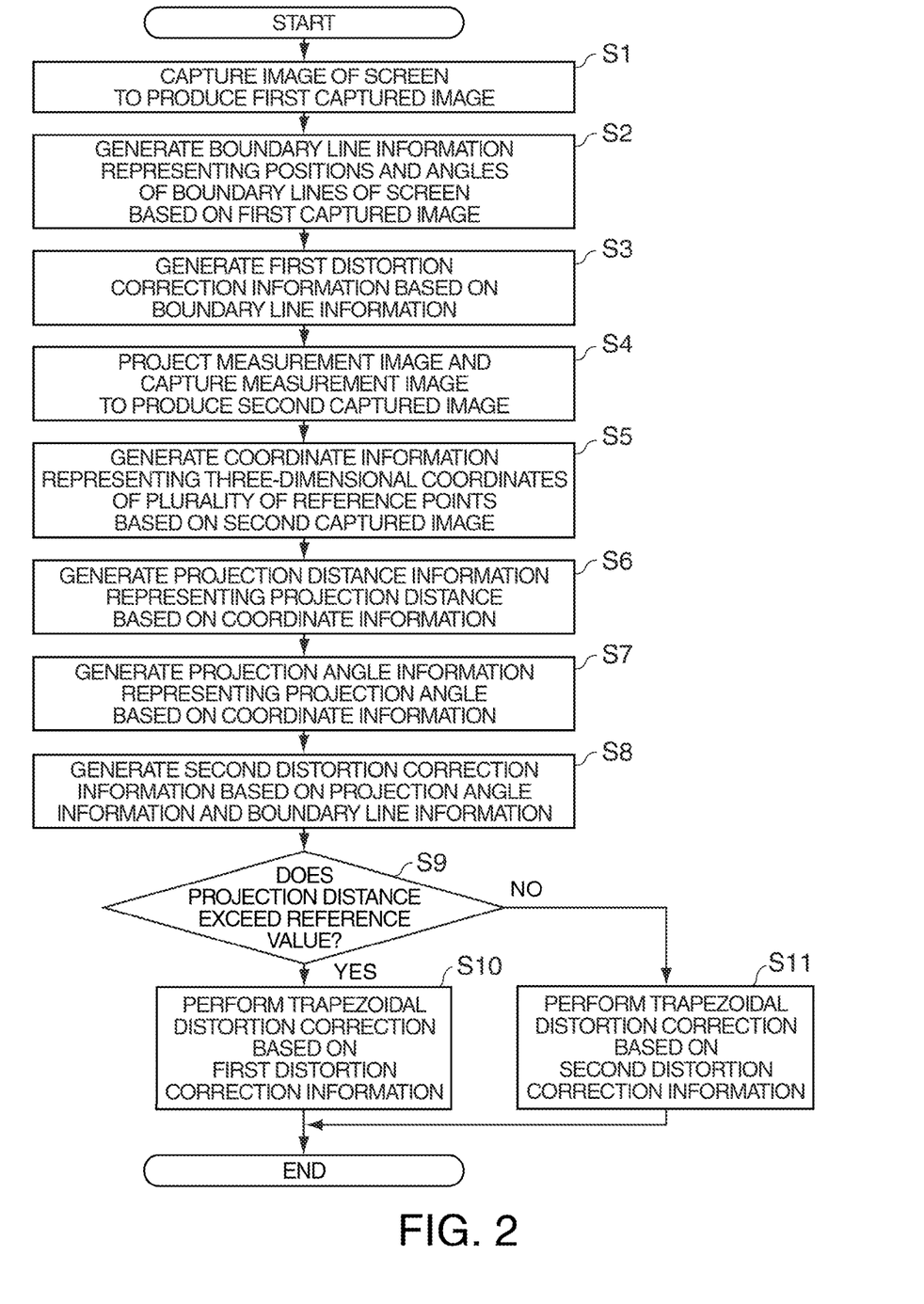
FIG. 2 is a flowchart showing a trapezoidal distortion correcting procedure in the first embodiment.

A description will next be made of a trapezoidal distortion correcting procedure using the sections described above. FIG. 2 is a flowchart showing the trapezoidal distortion correcting procedure in the first embodiment.

The capturing section 110 captures an image of the screen, which is one type of object on which an image is projected, with no image or a black image projected thereon to produce a first captured image (step S1). The boundary line information generating section 152 generates boundary line information on the coordinates of the boundary lines of the screen based on the first captured image (step S2).

The screen may, for example, have a rectangular white area and a black area provided around the white area. In this case, the white area is an area where a projected image can be displayed, and the boundary between the white and black areas corresponds to the boundary lines. The coordinate information may be information representing the coordinates of end points of each of the boundary lines, information representing the coordinates of at least one point on each of the boundary lines and inclination thereof, or any other suitable information.

Based on the boundary line information, the first distortion correction information generating section 157 sets a correction target area in an image formation area of a liquid crystal panel, the correction target area representing an area where an image having undergone trapezoidal distortion correction is displayed, and generates first distortion correction information representing the coordinates of the four corners of the correction target area in the image formation area (step S3).

More specifically, for example, when the boundary lines in the captured image form a rectangle, that is, when the captured image contains four boundary lines, the first distortion correction information generating section 157 sets the correction target area by converting the coordinates of the end points of each of the boundary lines in the captured image (capturing coordinate system) into the coordinates in a projection coordinate system.

When the captured image contains at least one but fewer than or equal to three boundary lines, the first distortion correction information generating section 157 sets the correction target area by determining infinite points for the boundary lines of the screen, for example, in the projection coordinate system, the origin of which is the principal point of the projection lens, converting the coordinates of the infinite points into the coordinates of vanishing points in the projection coordinate system, and interpolating a straight line(s) passing through the vanishing points as a missing side(s) (missing boundary line(s)).

Figure 3:
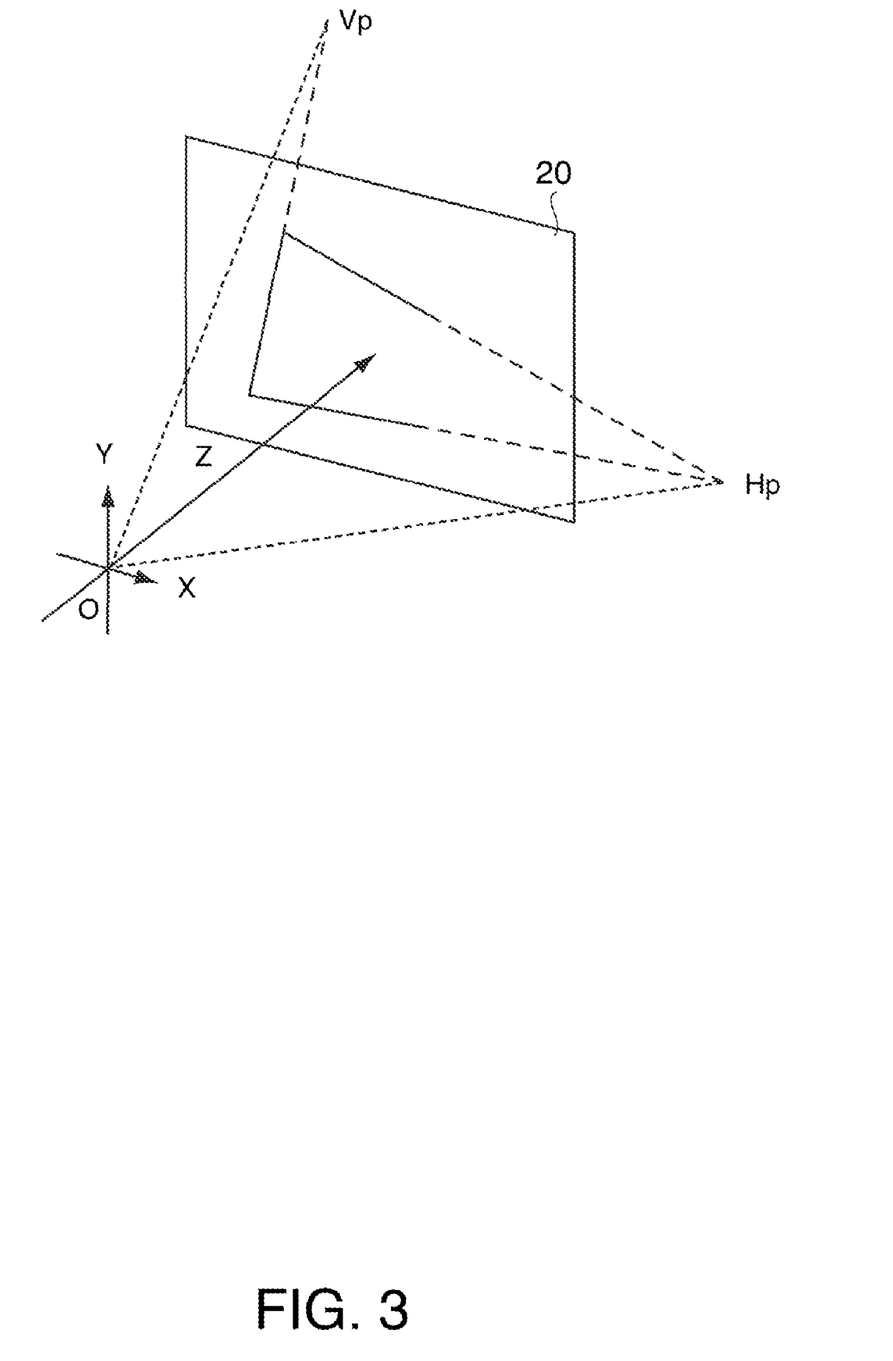
FIG. 3 diagrammatically shows vanishing points in the first embodiment.

FIG. 3 diagrammatically shows the vanishing points in the first embodiment. For example, in the example shown in FIG. 3, three sides (three boundary lines) of the screen, the upper side, the lower side, and the left side, have been detected. When three sides have been detected, the first distortion correction information generating section 157, based on a vanishing point in the vertical or horizontal directions, determines a vanishing point in the other direction.

Specifically, in the example shown in FIG. 3, for example, the first distortion correction information generating section 157 sets in the plane corresponding to Z=1 an imaginary area 20 parallel to the image formation area of the liquid crystal panel and having the same shape as that of the image formation area in the three-dimensional projection coordinate system, the origin O of which is the principal point of the projection lens, and computes the coordinates of a horizontal vanishing point Hp where an extension of the upper side of the screen intersects an extension of the lower side thereof.

A vertical vanishing point Vp is on an extension of the left side, and the vanishing points and the origin O form a right angle. The first distortion correction information generating section 157 uses the fact described above to compute the coordinates of the vertical vanishing point Vp where an extension of the left side of the screen 10 intersects an extension of the right side thereof.

As described above, when both the upper and lower sides and the left or right side have been detected, the first distortion correction information generating section 157 can set a correction target area by computing the coordinates of each of the vanishing points to interpolate a missing side.

When both the left and right sides and upper or lower side have been detected, the first distortion correction information generating section 157 can interpolate a missing side and hence set a correction target area by swapping the computation procedure described above between the vertical and horizontal directions and computing the coordinates of each of the vanishing points. When all the four sides have been detected, the first distortion correction information generating section 157 can set a correction target area by using the coordinates of the intersections of the sides.

While the description has been made of the case where at least three sides have been detected, the first distortion correction information generating section 157 can set a correction target area when only one or two sides have been detected. For example, let θ and φ be the pitch angle and the yaw angle, respectively, representing the projection angle, and assume that the roll angle is zero. In this case, the two-dimensional coordinates of the vertical vanishing point Vp is expressed by Equation (1), and the two-dimensional coordinates of the horizontal vanishing point Hp is expressed by Equation (2).

$$Vp = \left(0, \ -\frac{1}{\tan\theta}\right) \quad (1)$$

$$Hp = \left(\frac{1}{\tan\phi \times \cos\theta}, \ \tan\theta\right) \quad (2)$$

For example, when only two sides, the upper and lower sides, have been detected, the first distortion correction information generating section 157 can determine the coordinates of the horizontal vanishing point Hp by computing the intersection of an extension of the upper side and an extension of the lower side. In this case, the first distortion correction information generating section 157 can determine the pitch angle θ by using the coordinates of the horizontal vanishing point Hp and the equation for computing the two-dimensional coordinates thereof (Equation 2), and substitute the pitch angle θ into the equation for computing the two-dimensional coordinates of the vertical vanishing point Vp (Equation 1) to determine the two-dimensional coordinates of the vertical vanishing point Vp.

Further, for example, when only two sides, the upper or lower side and the left or right side, have been detected, the first distortion correction information generating section 157 can determine the two-dimensional coordinates of the vertical vanishing point Vp and the pitch angle θ by using the coordinates of one of the detected left and right sides and Equation 1. In this case, the first distortion correction information generating section 157 can also determine the two-dimensional coordinates of the horizontal vanishing point Hp by using the coordinates of one of the detected upper and lower sides, the pitch angle θ, and Equation 2.

Moreover, for example, when only two sides, the left and right sides, have been detected, the first distortion correction information generating section 157 can determine the two-dimensional coordinates of the vertical vanishing point Vp by computing the intersection of an extension of the left side and an extension of the right side. In this case, the two-dimensional coordinates of the horizontal vanishing point Hp is set to infinity (∞, 0).

As described above, the first distortion correction information generating section 157 can set a correction target area by using the coordinates of each of the detected sides and the coordinates of each of the vanishing points even when only two sides have been detected.

Further, for example, when only one side, the upper or lower side, has been detected, the first distortion correction information generating section 157 sets the two-dimensional coordinates of the vertical vanishing point Vp to infinity (0, ∞), assumes the pitch angle θ to be zero, and then uses the coordinates of the detected side and Equation 2 to determine the two-dimensional coordinates of the horizontal vanishing point Hp.

Further, for example, when only one side, the left or right side, has been detected, the first distortion correction information generating section 157 uses the coordinates of the detected side and Equation 1 to determine the two-dimensional coordinates of the vertical vanishing point Vp and sets the two-dimensional coordinates of the horizontal vanishing point Hp to infinity (∞, 0).

As described above, the first distortion correction information generating section 157 can set a correction target area by using the coordinates of each of the detected sides and the coordinates of each of the vanishing points even when the number of detected sides is one. When the captured image contains no boundary line, the projector 100 may project a message image that prompts a user to check, for example, the position where the projector 100 is installed.

The trapezoidal distortion correcting section 162 produces on the liquid crystal panel a measurement image for measuring a plurality of reference points, and the projecting section 190 projects the measurement image on the screen 10. The capturing section 110 captures the measurement image projected on the screen 10 to produce a second captured image (step S4).

Figure 4:
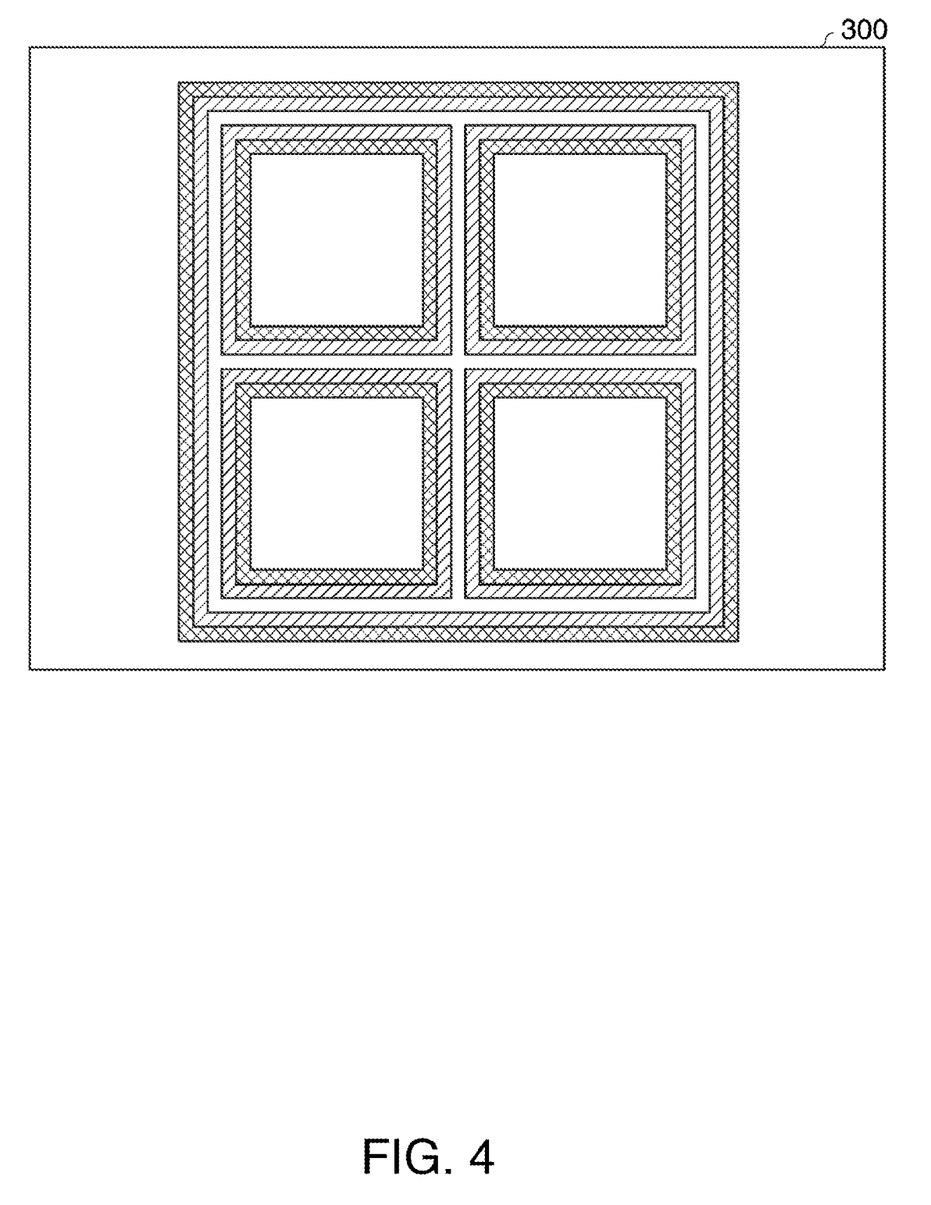
FIG. 4 shows an exemplary measurement image in the first embodiment.

FIG. 4 shows an exemplary measurement image 300 in the first embodiment. The measurement image 300 includes a patterned image formed of four rectangles arranged in two rows by two columns connected to one another. That is, the patterned image is formed by drawing three straight lines parallel to the vertical direction and evenly spaced apart and three straight lines parallel to the horizontal direction and evenly spaced apart in such a way that they intersect at right angles and 9 intersections (reference points) in total are generated. The space between the straight lines may be 200 pixels or greater when the liquid crystal panel has, for example, 1024×768 pixels. In the projector 100, when the straight lines, which form the pattern, are spaced apart from each other, measured brightness or any other parameter of one line will not interfere with that of the adjacent line.

Each of the straight lines contained in the patterned image has gradation so that a central portion of the line is the brightest portion and a peripheral portion of the line is the darkest portion. For example, the measurement image 300 shown in FIG. 4 has a white area in the central portion of each of the lines, light gray areas that sandwich the white area, and dark gray areas that sandwich the light gray areas.

The width of each of the areas may be, for example, 4 pixels or greater. The background around the patterned image is an area having a grayscale (white or black area, for example) different from that of the peripheral area (the dark gray area in the present embodiment) of the patterned image. When the background around the patterned image has a grayscale darker (black, for example) than that of the peripheral area of the patterned image, the measurement image 300 has four different grayscales in the entire image including the patterned image and the background therearound. The measurement image 300 may alternatively have three different grayscales in the entire image including the patterned image and the background therearound, that is, may be an image including a patterned image formed of a white area and a light gray area and a background image formed of a dark gray area. In other words, the measurement image 300 may be an image including a first area having a first grayscale (white area), a second area having a second grayscale darker than the first grayscale (dark gray area), and a third area having a third grayscale darker than the first grayscale but brighter than the second grayscale and provided between the first and second areas (light gray area).

The coordinate information generating section 154 generates coordinate information representing the three-dimensional coordinates of the plurality of reference points based on the second captured image (step S5). More specifically, the coordinate information generating section 154 determines the coordinates of the 9 reference points contained in the captured image, by performing parabolic approximation, gravity center computation, or any other suitable computation based on the information, for example, on brightness of the captured image. The determined coordinates are two-dimensional coordinates in an area where the capturing section 110 forms an image (capturing coordinate system).

The coordinate information generating section 154 processes the two-dimensional coordinates by performing active stereoscopy-based computation, which uses the parallax between the projection lens of the projecting section 190 and an capturing lens of the capturing section 110, to determine the three-dimensional coordinates of the reference points on the screen and produce coordinate information representing the three-dimensional coordinates of the reference points. The thus produced three-dimensional coordinates belong to the projection coordinate system, the origin of which is the principal point of the projection lens.

The projection distance information generating section 130 generates projection distance information representing the projection distance, which is the distance from the projector 100 to the screen 10, based on the coordinate information (step S6).

Figure 5:
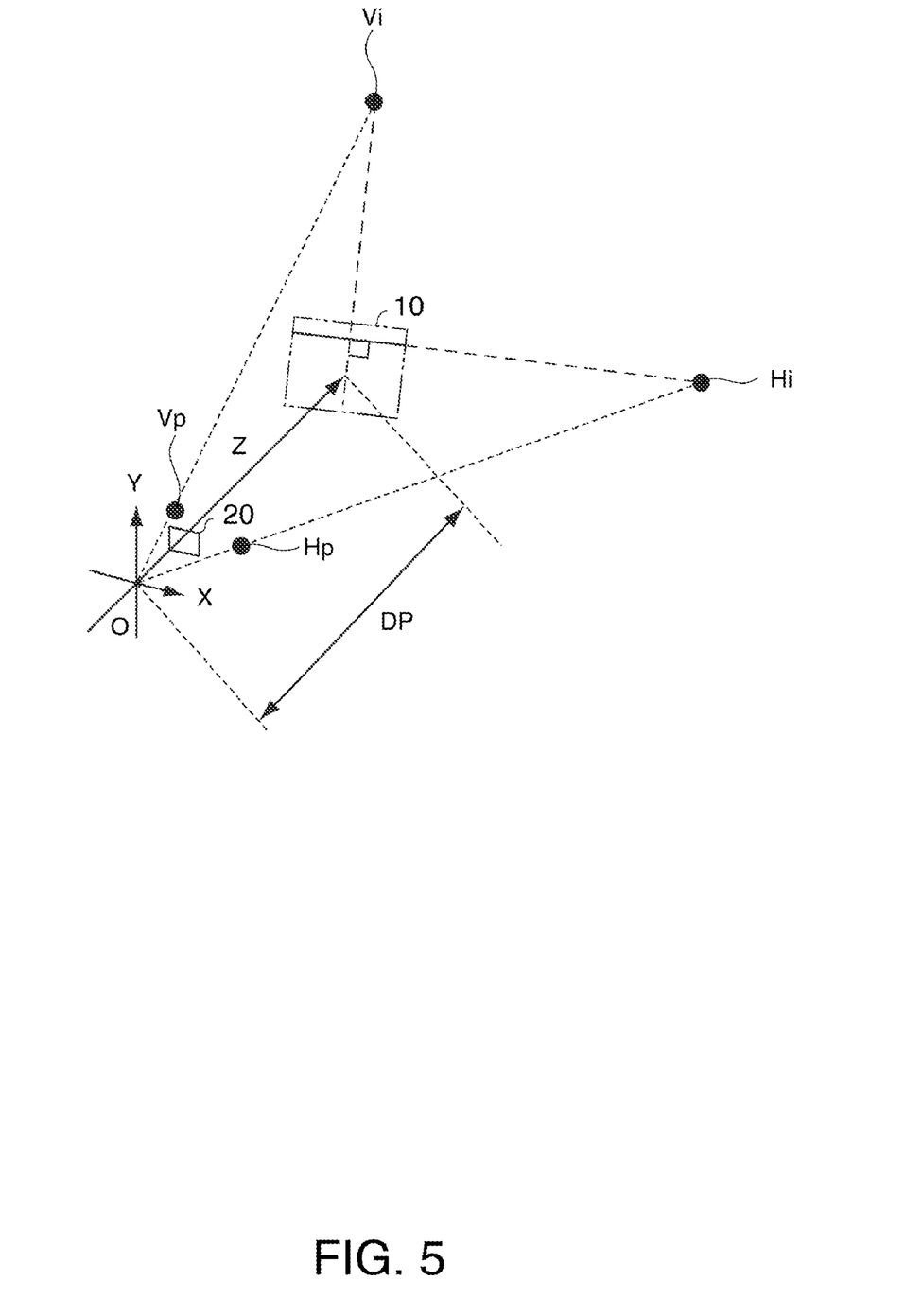
FIG. 5 diagrammatically shows vanishing points in a three-dimensional space in the first embodiment.

FIG. 5 diagrammatically shows vanishing points in the three-dimensional space in the first embodiment. For example, there is an infinite point Hi on an extension of a boundary line of the upper side in the screen 10 (the solid line in the screen 10 shown in FIG. 5), as shown in FIG. 5. Further, there is an infinite point Vi on extensions of the left and right sides. The infinite point Vi is also on an extension of a straight line perpendicular to the upper side.

In practice, although the infinite points are infinitely away, they are diagrammatically shown in the interest of clarity of description of FIG. 5. Although the infinite point Hi on the right side and the infinite point Vi on the upper side are used to determine the vanishing points in the present embodiment, an infinite point on the left side and an infinite point on the lower side may be used to determine the vanishing points. The positions of the vanishing points are invariant irrespective of which of the methods is employed. Further, although the liquid crystal panel is located, in practice, in front of the principal point O of the projection lens (in the −Z direction), it is assumed for the purposes of simplicity of the description that the imaginary area 20 having the same shape as that of the image formation area of the liquid crystal panel is disposed, for example, at Z=1 in parallel to the XY plane.

For example, in FIG. 5, the projection distance is the distance DP from the principal point O of the projection lens to a predetermined point on the screen 10 (the central reference point in the measurement image 300 projected on the screen 10, for example).

The projection angle information generating section 155 uses at least three sets of three-dimensional coordinates among the three-dimensional coordinates of the 9 reference points described above to generate projection angle information representing the vertical and horizontal inclination (projection angle) of the projection light relative to the screen 10 (step S7).

The second distortion correction information generating section 159 generates second distortion correction information representing a correction target area on the liquid crystal panel based on the projection angle information and the boundary line information (step S8). More specifically, for example, when the captured image contains one to three boundary lines, the second distortion correction information generating section 159 generates second distortion correction information representing the correction target area by using the boundary line information and the projection angle information to determine vanishing points and interpolating a line segment(s) on the straight line(s) passing through the vanishing points as the missing boundary line(s).

More specifically, the second distortion correction information generating section 159 can determine the vertical vanishing point Vp and the horizontal vanishing point Hp in the coordinate system (projection coordinate system) of the imaginary area 20 by projecting the infinite points shown in FIG. 5 on the plane of the imaginary area 20.

Figure 6:
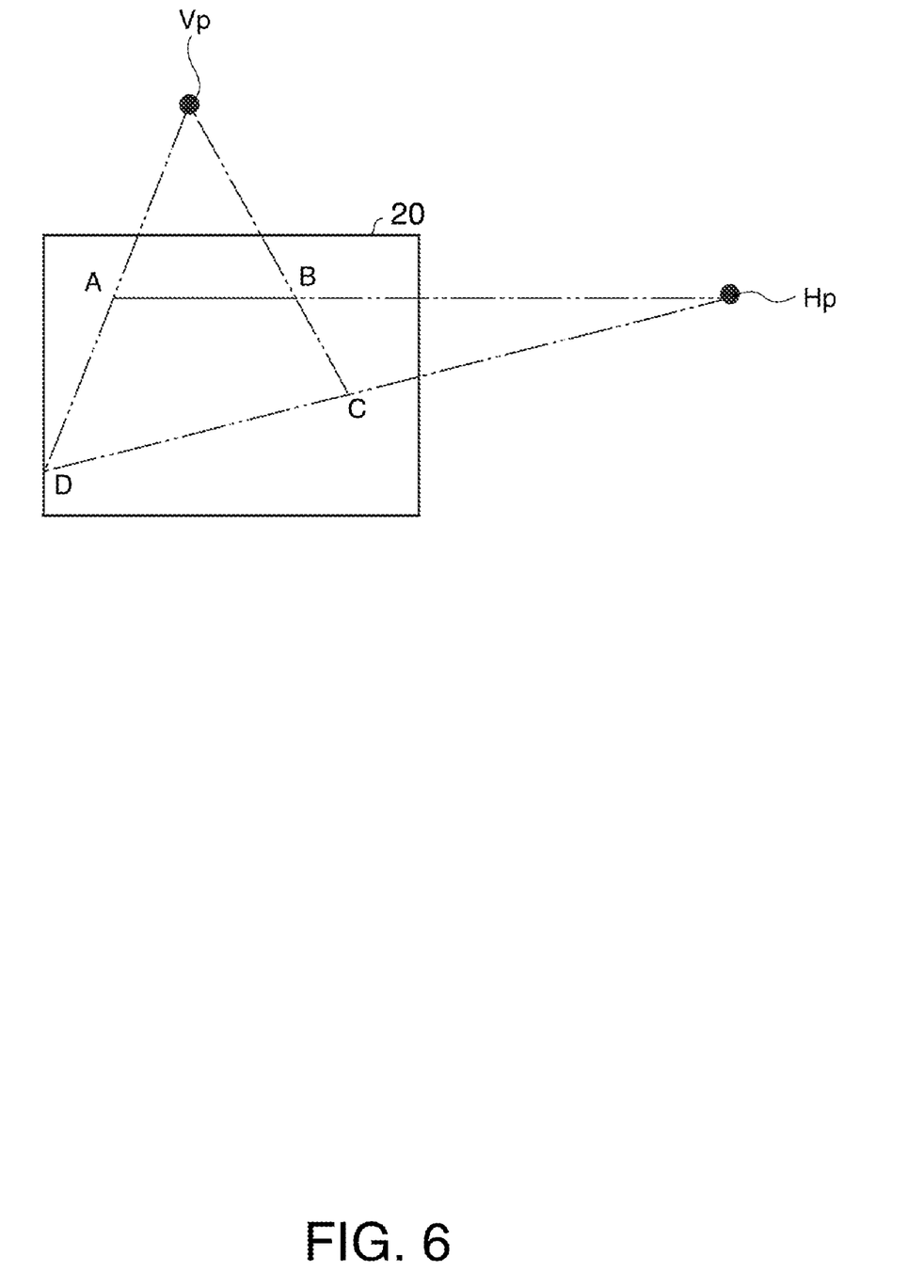
FIG. 6 diagrammatically shows an example of the vanishing points in the coordinate system of an imaginary area in the first embodiment.
Figure 7:
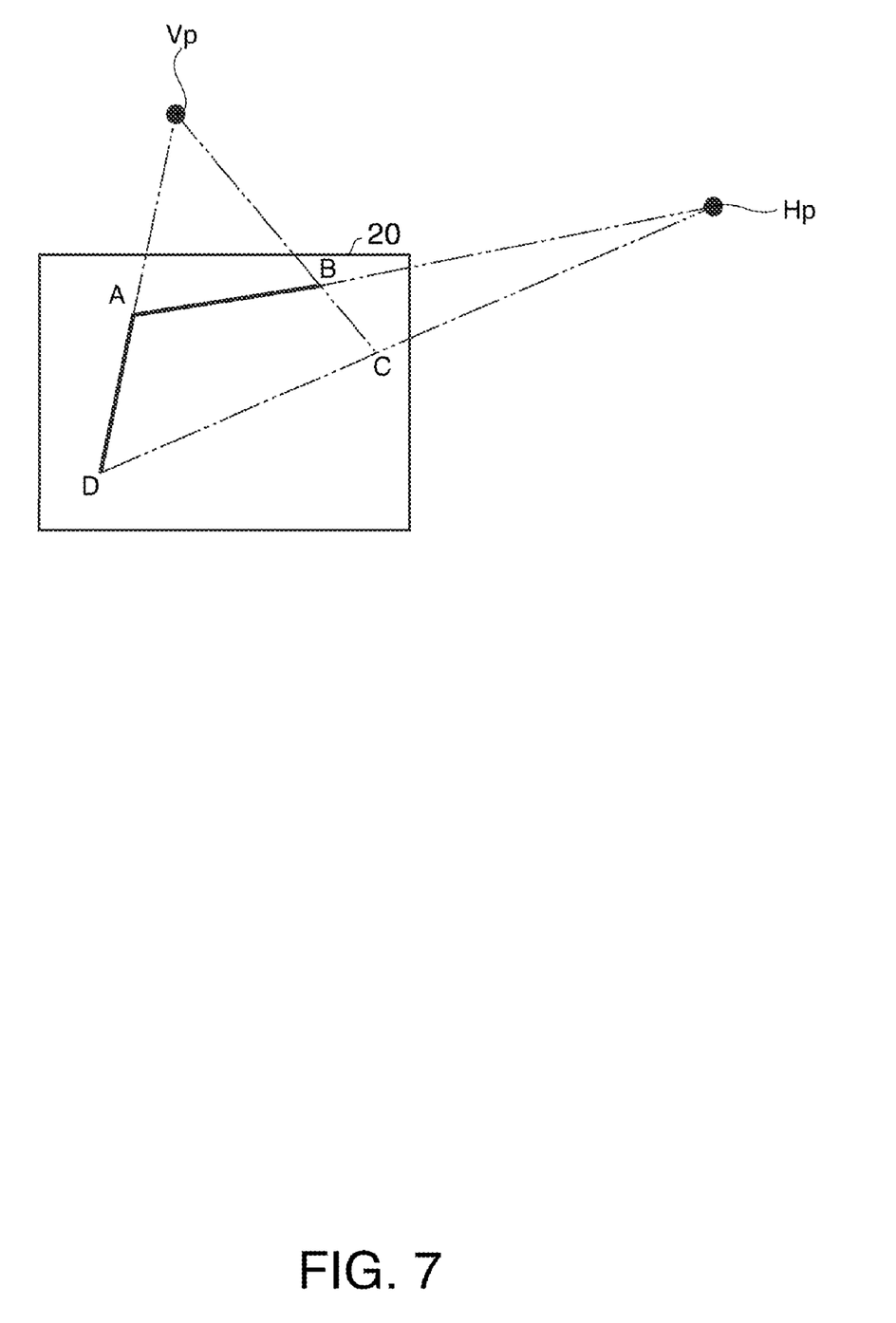
FIG. 7 diagrammatically shows another example of the vanishing points in the coordinate system of the imaginary area in the first embodiment.

FIG. 6 diagrammatically shows an example of the vanishing points in the coordinate system of the imaginary area 20 in the first embodiment. FIG. 7 diagrammatically shows another example of the vanishing points in the coordinate system of the imaginary area 20 in the first embodiment.

For example, as shown in FIG. 6, when only one boundary line has been detected, the second distortion correction information generating section 159 makes up the missing sides by using the projection angle information, the coordinates of the boundary line, and the coordinates of the vanishing points to set straight lines passing through the vanishing points, followed by determining the coordinates of the four corners of a target area ABCD in the imaginary area 20 so that a predetermined condition is satisfied. A correction target area on the liquid crystal panel is thus set.

The target area ABCD is an area corresponding to the correction target area on the liquid crystal panel. The predetermined condition described above, for example, corresponds to a condition in which a corrected image satisfies a predetermined aspect ratio (4:3 or 16:9, for example), a condition in which the largest possible area of the liquid crystal panel is used, or any other suitable condition.

For example, as shown in FIG. 7, when two or more boundary lines have been detected, the second distortion correction information generating section 159 makes up the missing side(s) by using the projection angle information, the coordinates of each of the boundary lines, and the coordinates of the vanishing points to set a straight line(s) passing through the vanishing points, followed by determining the target area ABCD. A correction target area on the liquid crystal panel is thus set.

The judging section 140 judges whether the projection distance exceeds a reference value based on the projection distance information (step S9). The reference value, for example, ranges from 3 to 5 meters, although it depends on the capturing and other conditions.

When the projection distance exceeds the reference value, the trapezoidal distortion correcting section 162 performs trapezoidal distortion correction by setting a correction target area on the liquid crystal panel based on the first distortion correction information and producing an image in the correction target area (step S10).

On the other hand, when the projection distance does not exceed the reference value, the trapezoidal distortion correcting section 162 performs trapezoidal distortion correction by setting a correction target area on the liquid crystal panel based on the second distortion correction information and producing an image in the correction target area (step S11).

As described above, according to the present embodiment, the projector 100 can perform trapezoidal distortion correction by using the projection distance-based method, whereby the trapezoidal distortion correction can be performed accurately irrespective of the projection distance.

Further, according to the present embodiment, the projector 100 can perform trapezoidal distortion correction by using the projection angle information and the boundary line information even when the screen 10 is not perpendicular to the ground but inclined thereto.

Further, according to the present embodiment, the projector 100 can project an image having undergone trapezoidal distortion correction in an area along the boundary lines of the screen 10 by using the information on the boundary lines of the screen 10.

Further, according to the present embodiment, the projector 100 can determine a correction target area by using only the two-dimensional coordinates of the imaginary area 20 without using any three-dimensional coordinates when the first distortion correction information is generated, and can determine a correction target area by using three-dimensional coordinates and the two-dimensional coordinates of the imaginary area 20 when the second distortion correction information is generated.

Second Embodiment

The distortion correction information generating method is not limited to that described in the first embodiment, but a variety of variations can be implemented. In a second embodiment, a distortion correction information generating method different from that in the first embodiment will be described.

Figure 8:
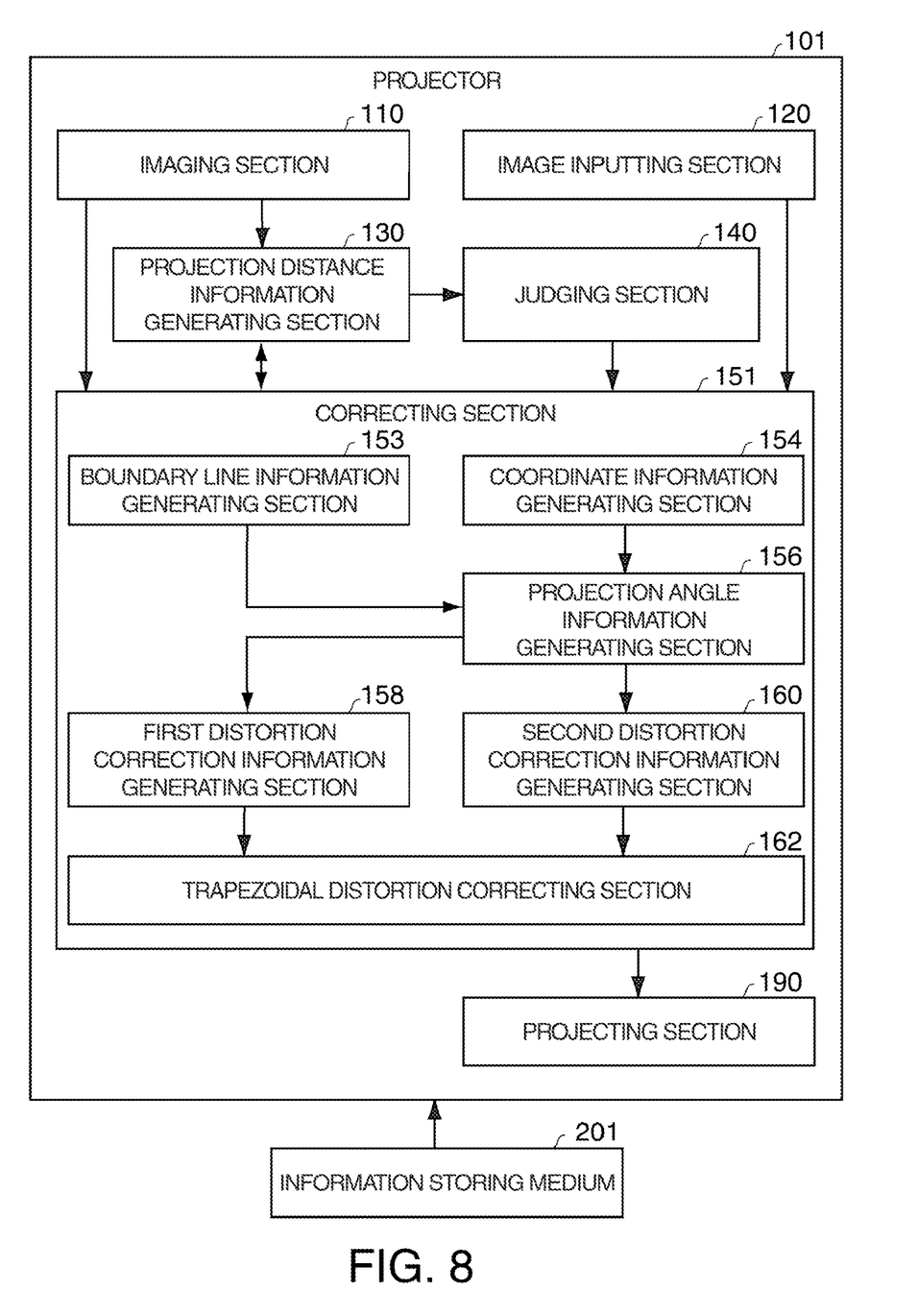
FIG. 8 is a functional block diagram of a projector in a second embodiment.

FIG. 8 is a functional block diagram of a projector 101 in the second embodiment. A correcting section 151 in the projector 101 differs from the correcting section 150 in the projector 100 in that a projection angle information generating section 156 uses boundary line information from a boundary line information generating section 153 to generate projection angle information, a first distortion correction information generating section 158 uses the projection angle information to generate first distortion correction information, and a second distortion correction information generating section 160 generates second distortion correction information without using the boundary line information. The projector 101 may also read a program from an information storing medium 201 and function as the first distortion correction information generating section 158 and other sections.

Figure 9:
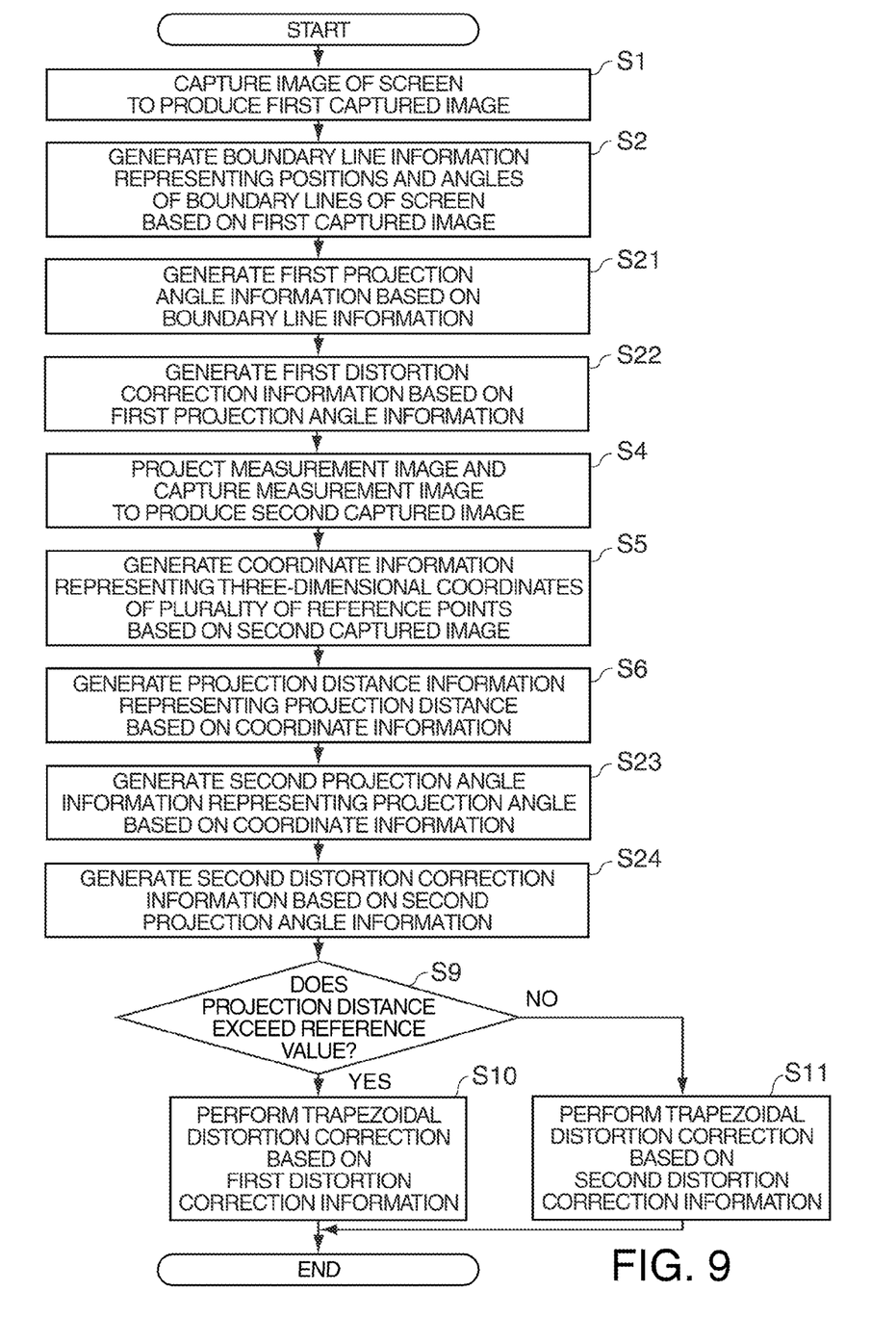
FIG. 9 is a flowchart showing a trapezoidal distortion correcting procedure in the second embodiment.

A trapezoidal distortion correcting procedure in the projector 101 will next be described. FIG. 9 is a flowchart showing the trapezoidal distortion correcting procedure in the second embodiment. The steps S1 and S2 are the same as those in the first embodiment.

The projection angle information generating section 156 generates first projection angle information representing the projection angle based on the boundary line information from the boundary line information generating section 153 (step S21). The first distortion correction information generating section 158 generates first distortion correction information based on the first projection angle information (step S22).

More specifically, for example, the first distortion correction information generating section 158 may figure out the projection angle in the vertical direction and the projection angle in the horizontal direction based on the first projection angle information and use, for example, data that relate the projection angles to the coordinates of a correction target area to generate first distortion correction information representing the correction target area in accordance with the projection angles.

The steps S4 to S6 are the same as those in the first embodiment. The projection angle information generating section 156 generates second projection angle information representing the projection angles based on the coordinate information from the coordinate information generating section 154 (step S23). Since the first projection angle information is based on the boundary lines of the screen 10, whereas the second projection angle information is based on the three-dimensional coordinates of the reference points in the measurement image 300 on the screen 10, the first and second projection angle information may differ from each other in some cases.

The second distortion correction information generating section 160 generates second distortion correction information based on the second projection angle information, for example, by using the data described above (step S24). The steps S9 to S11 are the same as those in the first embodiment.

As described above, the present embodiment also provides the same advantageous effect as that provided by the first embodiment.

Other Embodiments

The invention is not necessarily applied to the embodiments described above, but a variety of variations can be implemented. For example, in the projectors 100 and 101 described in the above embodiments, the projection distance is judged after two types of distortion correction information are generated. The distortion correction information may alternatively be generated after the judgment of the projection distance and in accordance with the judgment result.

The reference value used to choose which of the trapezoidal distortion correcting methods may be determined in accordance with, for example, the size of the screen 10, which is an object on which an image is projected. For example, the judging section 140 may determine the reference value based on information representing user's selection of the type of the screen, data representing the size of the screen, or other information and make the judgment by using the thus determined reference value.

The object on which an image is projected is not limited to the screen 10, but may be a blackboard, a whiteboard, a wall, a column, a desk, or any other suitable object.

The measurement image 300 is not limited to that described in the above embodiments. For example, the patterned image in the measurement image 300 may have straight lines that lie off the contour of the patterned image shown in FIG. 4 (for example, a #-like shape when the patterned image is rectangular).

The number of grayscales of the patterned image described above is three, but the number may be four or greater. Further, areas having the same grayscale are disposed on both sides of the white area in the patterned image described above, but areas having different grayscales may alternatively be disposed only on one side. For example, the patterned image may be a linear image formed of a leftmost dark gray area, a central light gray area, and a rightmost white area.

The coordinate information produced by the coordinate information generating section 154 is not limited to the information representing three-dimensional coordinates in the projection coordinate system, but may, for example, be information representing three-dimensional coordinates in the capturing coordinate system. That is, when the projection lens and the capturing lens are located substantially in the same position in the projector 100 or 101, two-dimensional coordinates in the capturing coordinate system may be directly converted into three-dimensional coordinates in the capturing coordinate system.

Further, each of the projectors 100 and 101 generates the coordinate information on the boundary lines of the screen by capturing the screen with no image projected thereon. Alternatively, when the boundary lines of the screen can be detected from the measurement image, the coordinate information on the boundary lines of the screen may be generated based on the captured measurement image.

The projection distance information generating section 130 may alternatively generate the projection distance information in accordance with a measured value from a distance sensor, an adjustment value used to drive a focus adjustment lens at the time of projection, user's selection of the projection distance when an image that prompts the user to select the projection distance is projected, user's input of a value representing the projection distance, or any other suitable parameter.

Each of the projectors 100 and 101 is not limited to a (transmissive or reflective, such as LCOS) liquid crystal projector, but may, for example, be a projector using a DMD (Digital Micromirror Device). DMD is a trade name of Texas Instruments Incorporated, USA. The functions of the projector 100 or 101 may be distributed to a plurality of apparatus (for example, a PC and a projector, an external camera and a projector, and other combinations).

The entire disclosure of Japanese Patent Application No. 2009-140119, filed Jun. 11, 2009 is expressly incorporated by reference herein.

What is claimed is:

1. A projector comprising:
   a capturing section that captures an object on which an image is projected to produce a captured image;
   a projection distance information generating section that generates projection distance information representing a projection distance, which is the distance to the object on which an image is projected;
   a judging section that judges based on the projection distance information whether the projection distance exceeds a reference value; and
   a correcting section that performs trapezoidal distortion correction based on boundary lines of the object on which an image is projected contained in the captured image when the projection distance exceeds the reference value, whereas performing trapezoidal distortion correction based on at least coordinate information representing three-dimensional coordinates of the object on which an image is projected when the projection distance does not exceed the reference value.

2. The projector according to claim 1,
   wherein the projection distance information generating section generates the projection distance information based on the captured image.

3. The projector according to claim 1,
   wherein the correcting section includes
   a boundary line information generating section that generates based on the captured image boundary line information on the coordinates of the boundary lines of the object on which an image is projected contained in the captured image, and
   a first distortion correction information generating section that generates based on the boundary line information first distortion correction information for performing the trapezoidal distortion correction.

4. The projector according to claim 1,
   wherein the correcting section includes
   a coordinate information generating section that generates based on the captured image the coordinate information representing the three-dimensional coordinates of a plurality of points on the object on which an image is projected,
   a projection angle information generating section that generates projection angle information representing the projection angle based on the coordinate information, and
   a second distortion correction information generating section that generates based on the projection angle information second distortion correction information for performing the trapezoidal distortion correction.

5. The projector according to claim 4,
   wherein the second distortion correction information generating section generates the second distortion correction information based on the projection angle information and the boundary line information.

6. The projector according to claim 4, wherein the projection distance information generating section generates the projection distance information based on the coordinate information.

7. A projector comprising:
a capturing section that captures an object on which an image is projected to produce a captured image;
a projection distance information generating section that generates projection distance information representing a projection distance, which is the distance to the object on which an image is projected;
a judging section that judges based on the projection distance information whether the projection distance exceeds a reference value; and
a correcting section that performs trapezoidal distortion correction based on boundary lines of the object on which an image is projected contained in the captured image when the projection distance exceeds the reference value, whereas performing trapezoidal distortion correction based on coordinate information representing three-dimensional coordinates of the object on which an image is projected and the boundary lines when the projection distance does not exceed the reference value.

8. A trapezoidal distortion correcting method comprising the step of:
capturing an object on which an image is projected by using a capturing device to produce a captured image;
generating projection distance information representing a projection distance, which is the distance to the object on which an image is projected;
judging based on the projection distance information whether the projection distance exceeds a reference value; and
performing trapezoidal distortion correction based on boundary lines of the object on which an image is projected contained in the captured image when the projection distance exceeds the reference value, whereas performing trapezoidal distortion correction based on at least coordinate information representing three-dimensional coordinates of the object on which an image is projected when the projection distance does not exceed the reference value.

* * * * *